(12) United States Patent
Hugg

(10) Patent No.: US 7,264,178 B1
(45) Date of Patent: Sep. 4, 2007

(54) FOAM SPRAYING RIG

(76) Inventor: Richard C. Hugg, 3775 "O" Ave., Westside, IA (US) 51467

( * ) Notice: Subject to any disclaimer, the term of this patent is extended or adjusted under 35 U.S.C. 154(b) by 0 days.

(21) Appl. No.: 11/490,355

(22) Filed: Jul. 20, 2006

(51) Int. Cl.
*B05B 1/24* (2006.01)
(52) U.S. Cl. ................. 239/129; 239/172; 239/130; 239/132.1; 165/51
(58) Field of Classification Search ........... 239/172, 239/128, 129, 130, 131, 132.1, 133, 132.5, 239/136, 138, 134, 137, 135, 132.3, 139; 165/51; 15/32
See application file for complete search history.

(56) References Cited

U.S. PATENT DOCUMENTS

| | | | | |
|---|---|---|---|---|
| 2,424,468 | A * | 7/1947 | Orell ........................... | 222/135 |
| 2,762,652 | A * | 9/1956 | Carter ......................... | 239/75 |
| 3,009,826 | A * | 11/1961 | Straughn et al. ............ | 427/219 |
| 3,146,950 | A * | 9/1964 | Lancaster ................... | 239/128 |
| 3,226,030 | A * | 12/1965 | Rossi ......................... | 239/135 |
| 3,511,440 | A * | 5/1970 | Black ......................... | 239/129 |
| 3,575,348 | A * | 4/1971 | MacKay ..................... | 239/127 |
| 3,682,054 | A * | 8/1972 | MacPhail et al. ........... | 239/130 |
| 3,720,226 | A * | 3/1973 | Minich, Jr. et al. ......... | 137/334 |
| 3,814,321 | A * | 6/1974 | Mulholland et al. ........ | 239/135 |
| 3,957,203 | A * | 5/1976 | Bullard ....................... | 239/128 |
| 4,190,205 | A * | 2/1980 | Mitchell ..................... | 239/219 |
| 4,191,348 | A * | 3/1980 | Holwerda ................... | 244/134 C |
| 4,196,854 | A * | 4/1980 | Prucyk ....................... | 239/129 |
| 4,529,127 | A * | 7/1985 | Huszagh ..................... | 239/112 |
| 4,940,082 | A * | 7/1990 | Roden ........................ | 15/321 |
| 5,287,913 | A * | 2/1994 | Dunning et al. ............ | 165/243 |
| 5,403,128 | A * | 4/1995 | Thomas ...................... | 406/39 |
| 5,645,217 | A * | 7/1997 | Warren ....................... | 239/75 |
| 5,975,162 | A * | 11/1999 | Link, Jr. ..................... | 151/231 |
| 6,109,826 | A * | 8/2000 | Mertes ........................ | 404/95 |
| 6,435,424 | B1 * | 8/2002 | Pauley et al. ............... | 239/128 |
| 6,533,189 | B2 | 3/2003 | Kott et al. .................. | 239/8 |
| 6,663,016 | B2 | 12/2003 | Bien .......................... | 239/130 |
| 6,666,385 | B1 * | 12/2003 | Gonitzke et al. ........... | 239/130 |
| 6,725,940 | B1 * | 4/2004 | Klein et al. ................. | 169/15 |
| 6,817,541 | B2 * | 11/2004 | Sands et al. ................. | 239/8 |
| 6,973,975 | B1 * | 12/2005 | Adamson et al. ........... | 169/24 |

(Continued)

FOREIGN PATENT DOCUMENTS

DE 4209427 * 8/1993

(Continued)

*Primary Examiner*—Kevin Shaver
*Assistant Examiner*—Trevor McGraw
(74) *Attorney, Agent, or Firm*—Thomte, Mazour & Niebergall, LLC; Dennis L. Thomte

(57) ABSTRACT

A foam spraying rig comprising a vehicle having first and second fluid spray component storage tanks mounted in the body of the vehicle, each of which are heated by electrical heaters and by tubing which is connected to the coolant of the water cooled engine of the vehicle. The rig also includes a heat exchanger tank including first and second heat exchangers, each of which have inlet and outlet ends. The outlet ends of the fluid component storage tanks are connected to the inlet ends of first and second pumps, respectively. The outlet ends of the first and second pumps are fluidly connected to the inlet ends of the first and second heat exchangers, respectively. The outlet ends of the first and second heat exchangers are fluidly connected to a spray nozzle which sprays the components onto a surface such as a wall surface or a truck bed.

12 Claims, 6 Drawing Sheets

U.S. PATENT DOCUMENTS

| | | | |
|---|---|---|---|
| 7,021,500 B1 | 4/2006 | Finn et al. | 222/145.5 |
| 7,044,401 B2 * | 5/2006 | Sims | 239/208 |
| RE39,249 E * | 8/2006 | Link, Jr. | 141/231 |
| 2003/0006295 A1 * | 1/2003 | Kenny et al. | 239/77 |
| 2007/0045445 A1 * | 3/2007 | Hackel et al. | 239/146 |

FOREIGN PATENT DOCUMENTS

| | | | |
|---|---|---|---|
| EP | 223519 A2 | * | 5/1987 |
| GB | 2092724 | * | 8/1982 |

* cited by examiner

FOAM SPRAYING RIG

BACKGROUND OF THE INVENTION

1. Field of the Invention

This invention relates to a foam spraying rig and more particularly to a more dependable machine for the purpose of spraying plural component foams, for example, insulation known as polyisocyantes.

2. Description of the Related Art

Plural component foams, such as insulation, are used as insulation and as liners for truck bodies. Polyisocyantes and a resin are combined and discharged from a spray nozzle at approximately 150° F. under a pressure of approximately 1500 psi or more. The equipment available today for applying the product derives from the commercial factory foam industry such as boat hull fill or factory foamed panels for buildings and cold storage. The equipment is meant to be used in a controlled environment and a relatively unabusive manner. The use of the equipment into the mobile market of home and industrial building insulation has been accomplished by taking the delicate equipment, mating it to a large mobile generator, and placing the equipment in a truck along with barrels of raw material and approximately 300 feet of fragile hose.

The problems associated with the current prior art mobile equipment are many. The electronics used in the factory setting are prone to expensive failure when used in a mobile or outdoor situation. The systems used to heat the material are electric resistance heaters and are very problematic, particularly in the area of the material hose that runs from the machine into the building being insulated. Computer panels, connectors, and other electronic devices which control and maintain the heating system and other functions, as well as the material hose, are very susceptible to failure and are very expensive to replace. Further, the generators required to run the equipment are very costly, usually approximately $15,000, as well as expensive to operate and maintain.

The components of the process come in 55 gallon drums and must be kept warm (approximately 85° F.) in storage in the truck prior to being processed through the spray equipment. This is difficult, particularly in the winter.

SUMMARY OF THE INVENTION

In general, the problems of the prior art have been solved by eliminating the expensive generator employed therewith and by using the truck engine to produce heat and air required to dispense the insulation at the proper temperature and pressure. Hot water heat generated by the truck engine coolant system is used to heat first and second component storage tanks within the truck body as well as heating a tank in which first and second heat exchangers are utilized. The system of this invention utilizes proven heat exchanger technology to transfer engine heat produced while powering the air compressor that provides the pressure for spraying, thereby creating a more efficient machine which costs less and operates for much less than previous machines.

More particularly, the system of this invention comprises the combination of a vehicle having an electrical system, a water cooled engine, and an enclosed body as well as the spray components described hereinbelow. A first fluid spray component storage tank is mounted in the body in an insulated compartment and has an inlet end and an outlet end. A second fluid spray component storage tank is mounted in an enclosed compartment within the body and has an inlet end and an outlet end. The inlet end of the first fluid spray component storage tank is in selective fluid communication with a source of first fluid spray component. The inlet end of the second fluid spray component storage tank is in selective fluid communication with a source of a second fluid spray component. The outlet end of the first fluid storage tank is in fluid communication with the inlet end of a first pump. The outlet end of the second fluid storage tank is in fluid communication with the inlet of a second pump. A first electrical heater assembly is associated with the first fluid spray component storage tank which selectively heats the first fluid spray component therein. A second electrical heater assembly is associated with the second fluid spray component storage tank which selectively heats the second fluid spray component therein.

A first hot water heater assembly is associated with the first fluid spray component storage tank which selectively heats the first fluid spray component therein. The first hot water heater assembly is in fluid communication with the heated coolant of the water cooled engine of the vehicle. A second hot water heater assembly is associated with the second fluid spray component storage tank which selectively heats the second fluid spray component therein. The second hot water heater assembly is also in fluid communication with the heated coolant of the water cooled engine of the vehicle.

An air compressor is provided on the vehicle and is driven by the vehicle engine and is in communication with the first and second fluid spray component storage tanks to pressurize the same to force the fluid outwardly therefrom through the outlet ends thereof. A heat exchanger tank is also mounted in the body of the truck and is enclosed within an insulated compartment. The heat exchanger tank has first and second heat exchangers positioned therein. Each of the first and second heat exchangers have inlet and outlet ends with the inlet ends of the first and second heat exchangers being in fluid communication with the outlet ends of the first and second pumps, respectively. The heat exchanger tank is in fluid communication with the heated coolant of the water cooled engine of the vehicle so that the first and second heat exchangers are in physical contact with the heated coolant to cause the components passing through the heat exchangers to be heated. The outlet ends of the first and second heat exchangers are in fluid communication with a hose package extending to a spray nozzle or gun for spraying the first and second fluid spray components onto a surface such as a truck body or on an area to be insulated. The air compressor is also connected to an air line in the hose package. A heated fluid line is provided in the hose package to heat the first and second fluid components passing therethrough.

It is therefore a principal object of the invention to provide an improved foam spraying machine.

A further object of the invention is to provide a device of the type described wherein the components of the foam are heated by means of the hot water of the coolant of the water cooled engine of the vehicle.

A further object of the invention is to provide a machine of the type described wherein the spray components are heated while in storage tanks in the vehicle body and are also heated as they pass through a heat exchanger with the heat exchanger being in fluid communication with the hot water of the engine.

A further object of the invention is to provide a machine of the type described which is economical of manufacture, durable in use and refined in appearance.

These and other objects will be apparent to those skilled in the art.

DESCRIPTION OF THE PREFERRED EMBODIMENT

Figure 1:
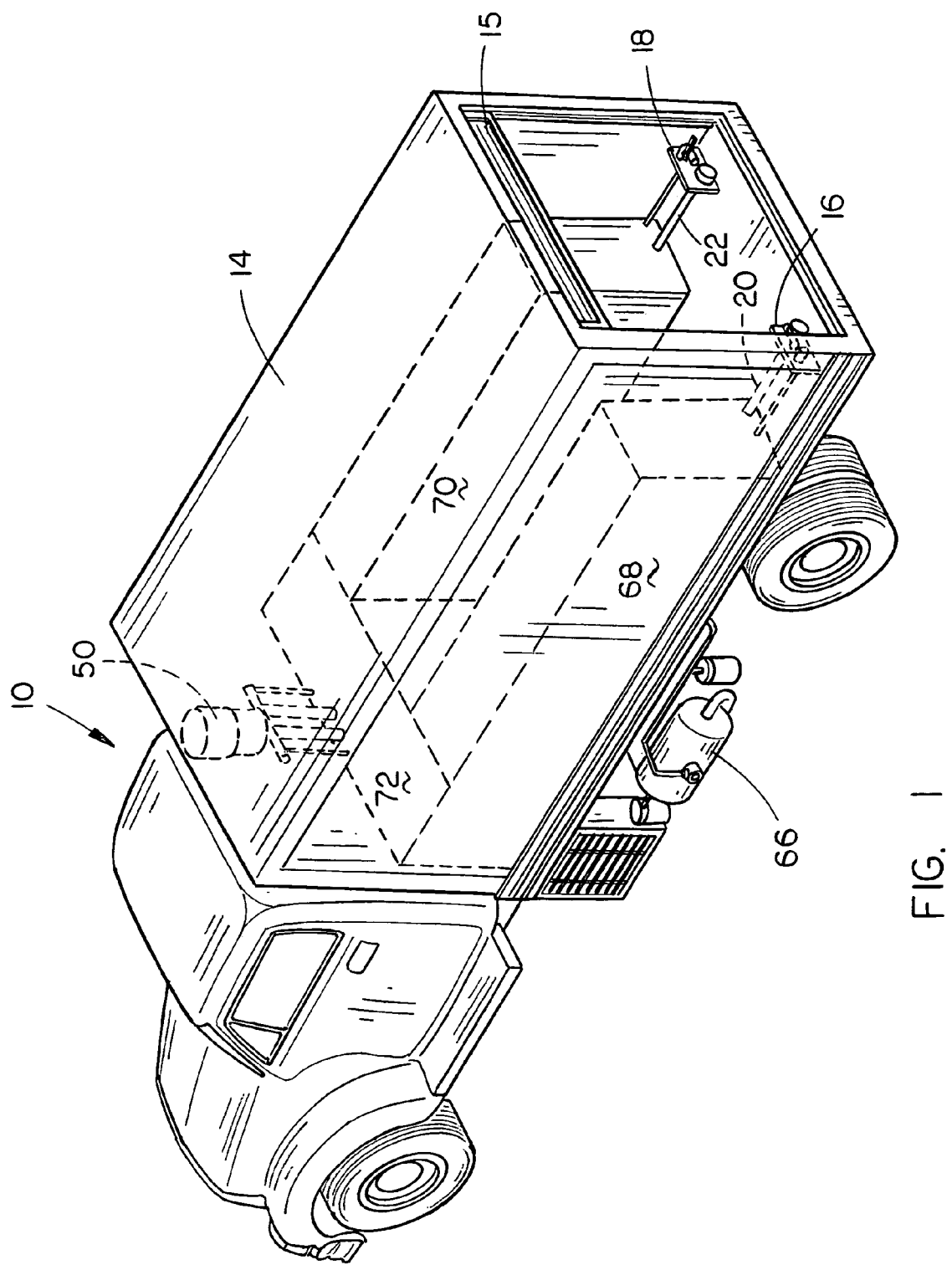
FIG. 1 is a perspective view of the foam spraying rig of this invention.
Figure 2:
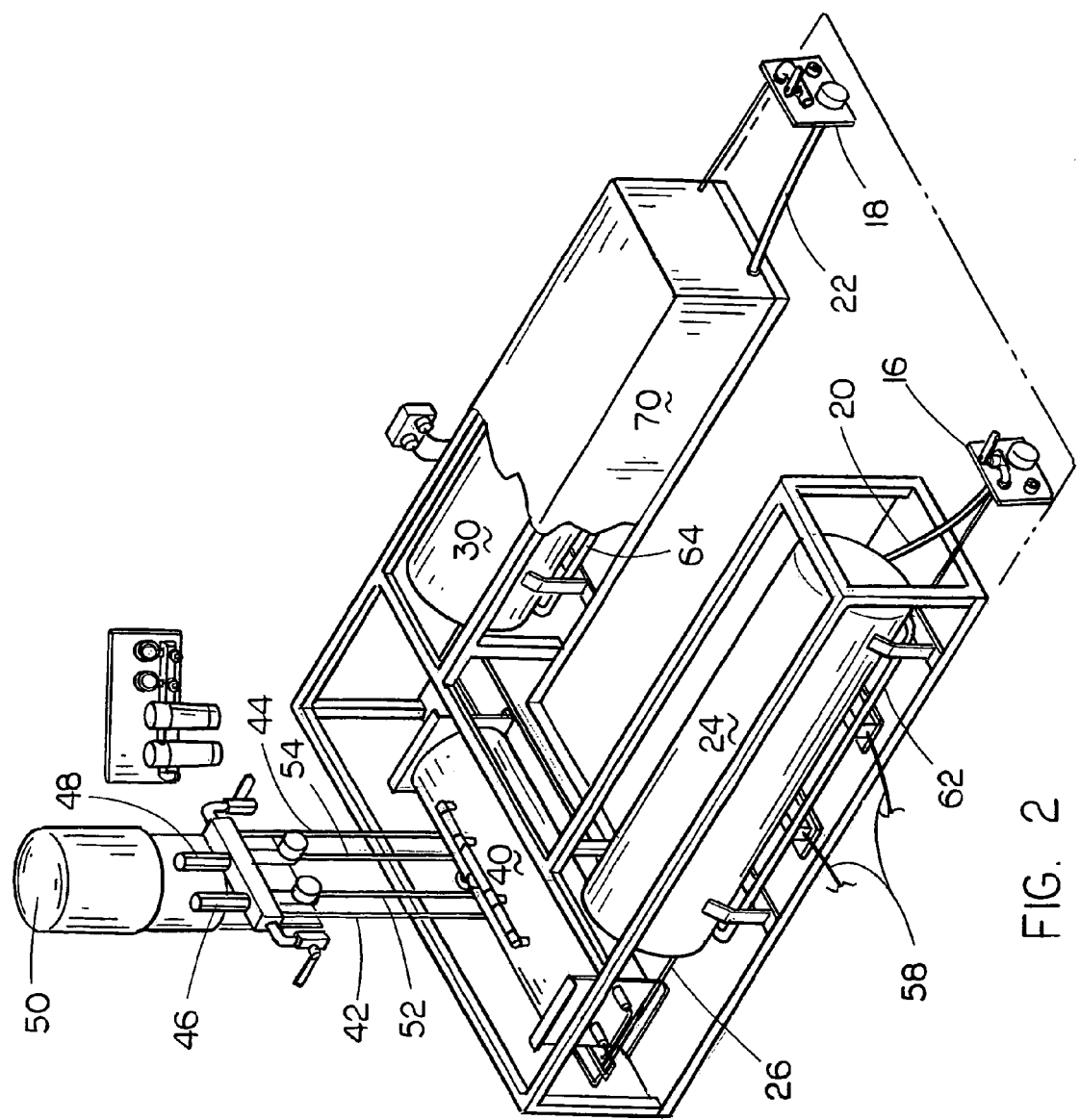
FIG. 2 is a partial perspective view of the spray system of this invention.
Figure 3:
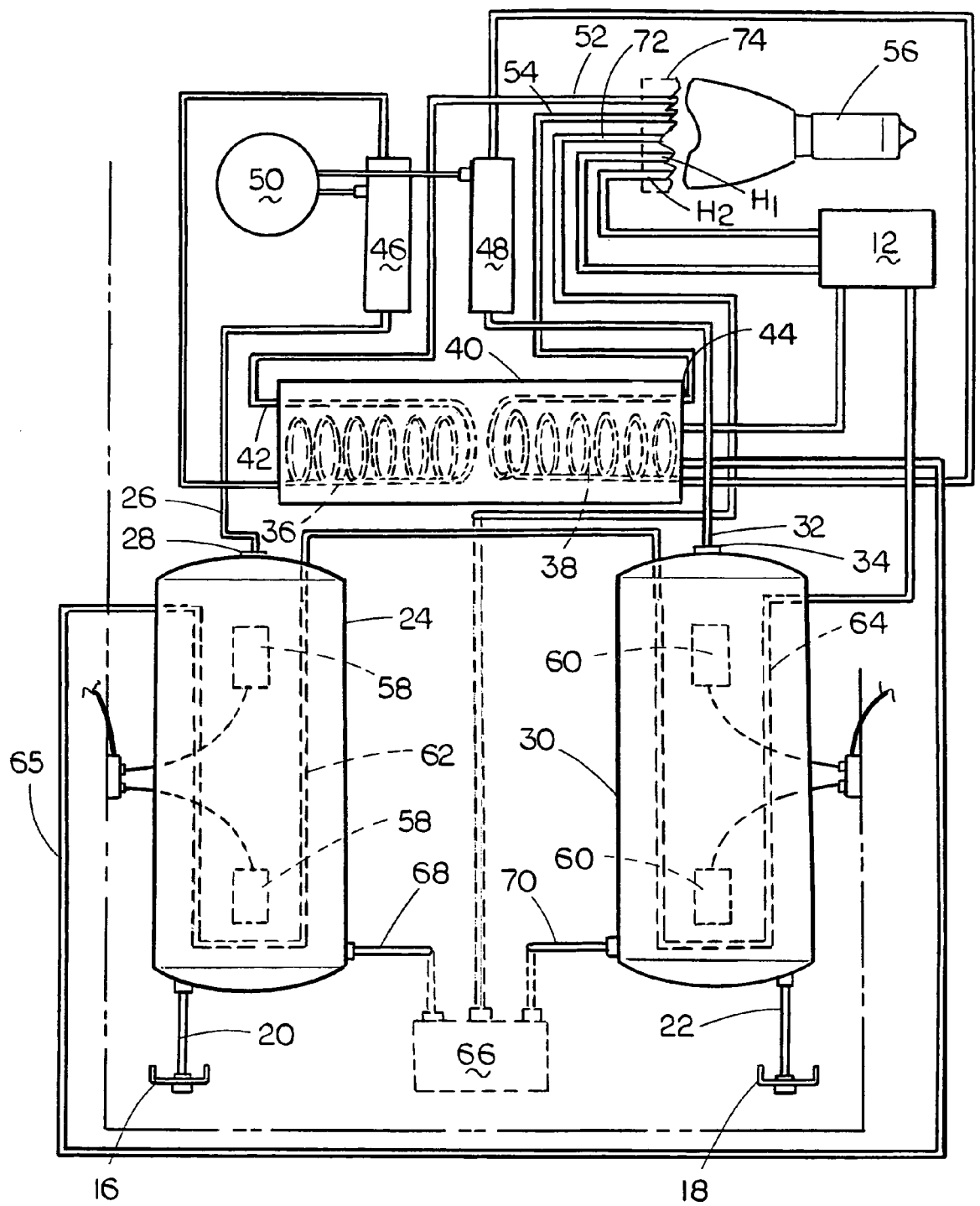
FIG. 3 is a schematic of the spray system of this invention.
Figure 4:
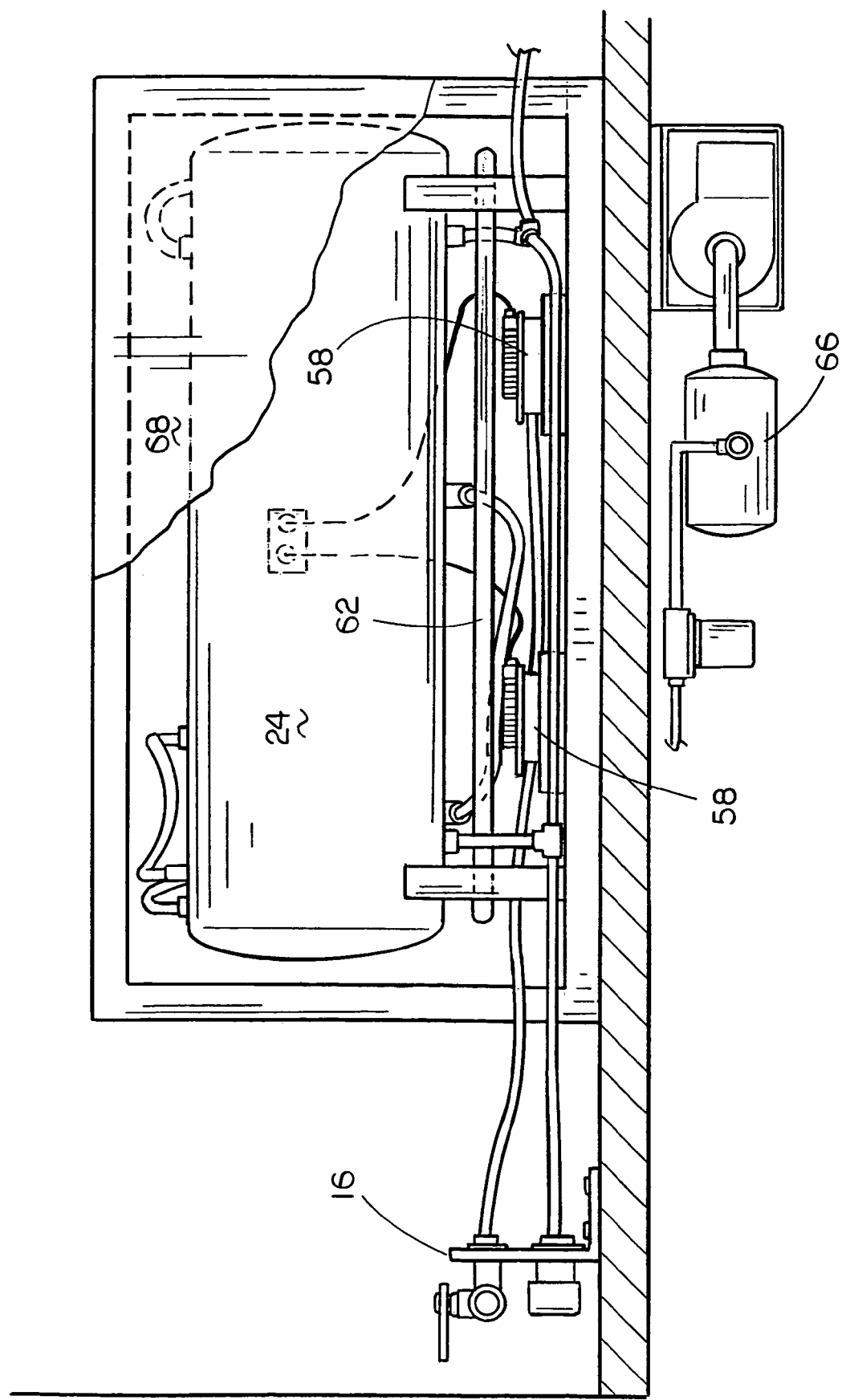
FIG. 4 is a side view of one of the component storage tanks and the air compressor.
Figure 5:
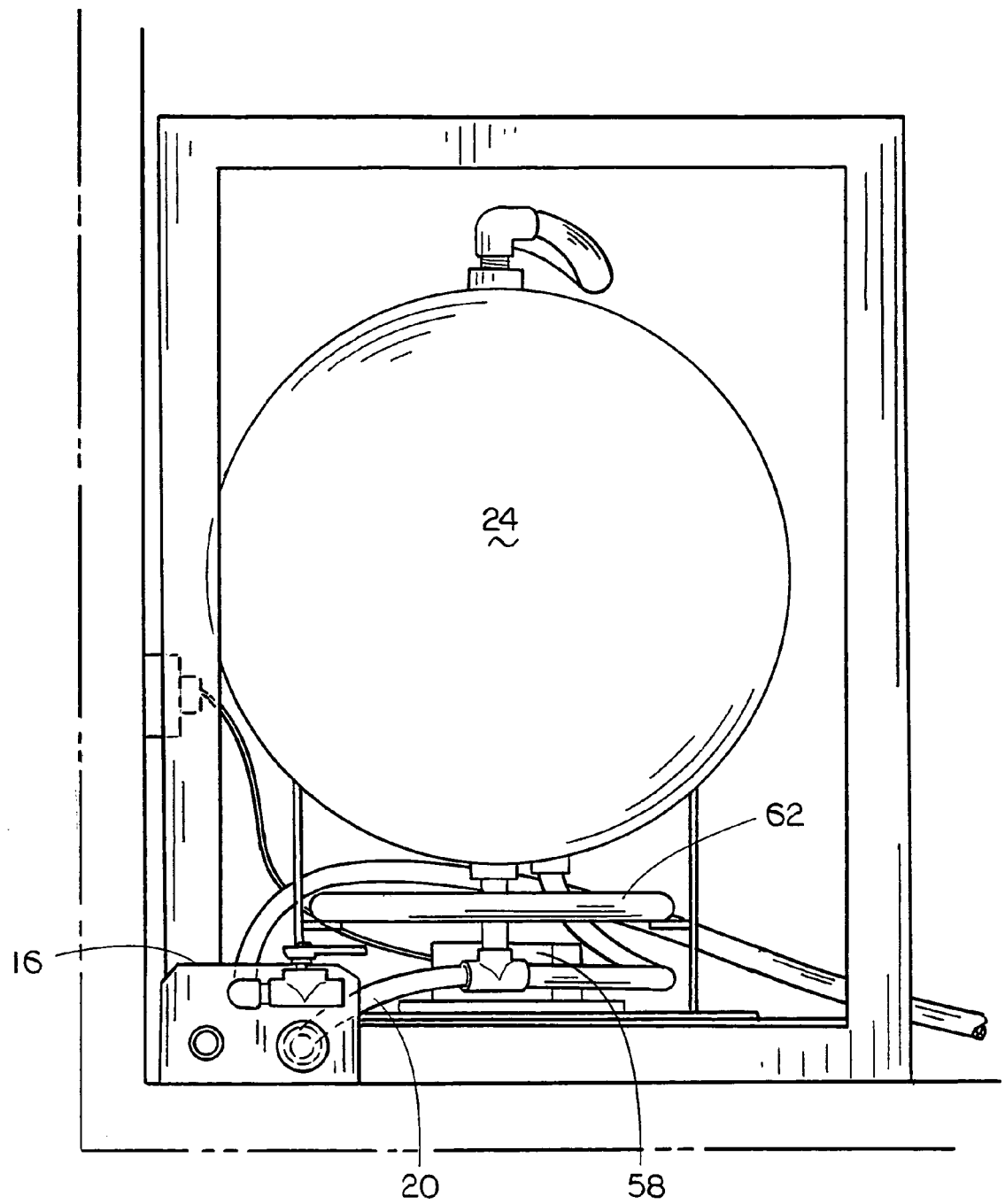
FIG. 5 is an end view of one of the component storage tanks.
Figure 6:
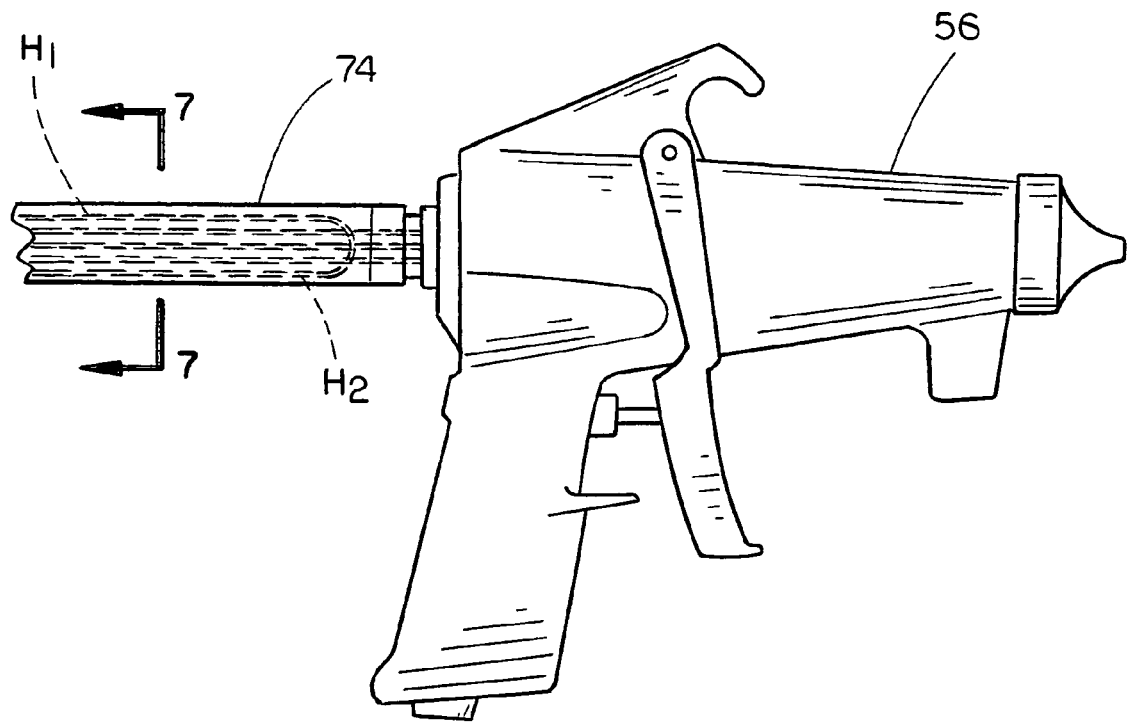
FIG. 6 is a partial side view of the hose bundle and spray nozzle.
Figure 7:
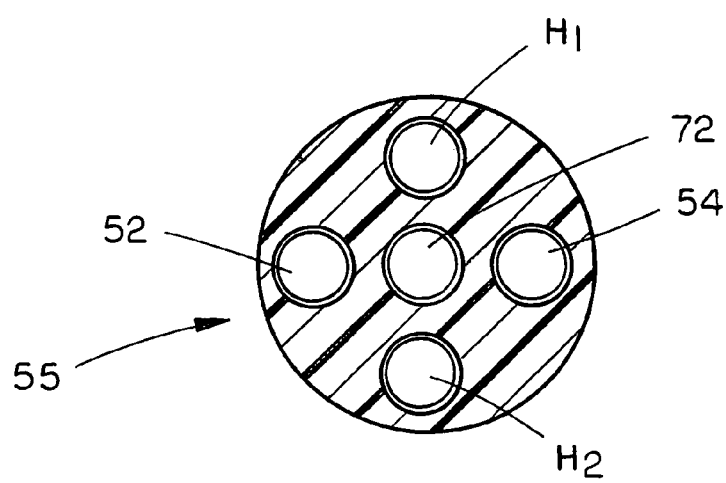
FIG. 7 is a sectional view of the hose bundle.

The numeral 10 refers generally to a truck-like vehicle which has a water (glycol) cooled engine with the engine hot water being generally indicated by the reference numeral 12 in the schematic of FIG. 3. Vehicle 10 includes a body 14 which is enclosed and which is preferably insulated, but not necessarily so. The rearward end of the body 14 is open, but is closeable by a conventional door 15. Quick couplings 16 and 18 are provided at the rearward end of the body 14 and have lines or conduits 20 and 22 connected thereto, respectively, and extending forwardly therefrom. The couplings 16 and 18 are adapted to be connected to a source of fluid spray components which will be described as first and second components, respectively. Normally, displacement pumps will be associated with the fifty-five gallon drums or barrels containing the components which will normally be left at the central office or storage facility. In some cases, the spray components will be contained within large bulk containers. When it is desired to pump the components to the system of this invention, the couplings 16 and 18 are utilized. The discharge end of conduit 20 is connected to the inlet end of a first fluid spray component storage tank 24 which has conduit 26 extending from outlet end 28 thereof. The discharge end of conduit 22 is connected to the inlet end of a second fluid spray component storage tank 30 which has a conduit 32 extending from the outlet end 34 thereof. The numerals 36 and 38 refer to heat exchangers positioned within a transversely extending heat exchanger tank 40. Conduits 26 and 32 extend forwardly from the tanks 24 and 30, respectively, as illustrated in the schematic of FIG. 3, and are connected to the inlet ends of conventional positive displacement pumps 46 and 48, respectively. Each of the heat exchangers 36 and 38 is comprised of a plurality of continuous coils with the discharge end thereof being connected to discharge conduits 42 and 44, respectively. The discharge ends of conduits 42 and 44 are connected to lines 52 and 54 contained within hose bundle 55 which extend to spray nozzle 56. The displacement pumps 46 and 48 are preferably driven by the air motor 50. Displacement pumps 46 and 48 meter the spray components therefrom at a precise ratio, which in the preferred embodiment is 1:1. The spray nozzle 56 mixes and sprays the two components onto the surface to be coated or insulated. Hoses or lines 52 and 54 are contained within a material hose bundle 55 as stated which includes hoses 52 and 54, a glycol outbound hose H1, a glycol return hose H2 and an air hose or line 72. Hose bundle 55 is heated with the hot coolant (glycol) of the truck engine. The heat exchanger water is pumped from the heat exchanger outwardly through the outbound glycol hose H1 and inwardly through the inbound hose H2 and back into the heat exchanger. Hose bundle 55 is wrapped with insulation and then sheathed to protect the insulation and contain the hoses.

A plurality of electrical resistance heating elements 58 are positioned below the tank 24 and are of the one hundred ten volt type. Similarly, a plurality of electrical resistance heaters 60 are provided below the tank 30 and are of the one hundred ten volt type. The heaters 58 and 60 are utilized when the vehicle is in storage so that the components in the tanks 24 and 30 may be heated during the night or heated at the job site when one hundred ten volt power is available.

The numeral 62 refers to a hot water heater in the form of copper pipe or tubing which is operatively fluidly connected to the heated coolant of the engine so that as the truck is being driven to the job site or idled at the job site, the hot water from the coolant system of the vehicle will be circulated through the heater 62 to further heat the component within tank 24. Similarly, a hot water heater 64 is positioned beneath the tank 30 and is operatively connected to the heated coolant of the vehicle engine to heat the component within the tank 30. The heaters 64 and 62 are series connected, as seen in FIG. 3, with the return line 65 connected to the inlet end of the tank 40. The outlet end of heat exchanger 38 is connected to line 54 while the outlet end of heat exchanger 36 is connected to the line 52 (FIG. 3). The outlet end of tank 40 is connected to the engine hot water 12. The hot water from the engine of the vehicle will be circulated through the heaters 62 and 64 while the vehicle is travelling from its home base to its job site and will also be utilized to heat the components in the tanks 24 and 30 while the truck is sitting at the job site so that the components within the tanks remain at approximately 90° F.

The numeral 66 refers to an air compressor which is driven by the vehicle engine or the electrical system thereof with the discharge lines 68 and 70 extending therefrom to the tanks 24 and 30, respectively, to apply approximately 50 pounds per square inch pressure within the tanks 24 and 30 to force the components therein through the heat exchangers 36 and 38 in the heat exchanger tank 40 when the pumps 46 and 48 are activated. Hose or line 72 extends from air compressor 66 through the hose bundle 55 to the spray nozzle 56.

As seen in the schematic of FIG. 3, the heat exchanger tank 40 is plumbed to the source of engine hot water so that the heat exchangers 36 and 38 will be heated by the hot water being passed through the heat exchanger tank 40 which causes the components passing therethrough to be heated to approximately 150° F.

Assuming that the truck or vehicle is being stored or parked for the evening, the components 1 and 2 will be pumped into the tanks 24 and 30 in conventional fashion. The electrical heaters 58 and 60 will be connected to a source of one hundred ten volt power so that the components in the tanks 24 and 30 will be heated during the night.

When it is time to travel to the job site, the heaters 58 and 60 will be disconnected from their source of electrical power. As the vehicle moves to the job site, the hot water from the engine coolant system will be forced through the heaters 62 and 64 as well as the heat exchanger tank 40 so that the components are heated as the vehicle is travelling to the job site and will be heated when the truck is parked and idled at the job site. The operator will operate the nozzle 56 so that the components are supplied thereto by way of the pumps 46 and 48 with the components being supplied to the nozzle 56 at approximately 1500 psi. As seen, the storage tanks 24 and 30 are enclosed within insulated housings or compartments 68 and 70, respectively, and the heat exchanger 40 is enclosed within an insulated housing or compartment 72.

Thus it can be seen that a novel apparatus has been disclosed which ensures that the components of the foam spray will be heated to the proper temperature and will be maintained at the proper temperature and will be supplied to the nozzle at the proper pressure.

Thus it can be seen that the invention accomplishes at least all of its stated objectives.

I claim:

1. In combination:
   a vehicle having an electrical system, a water cooled engine, and an enclosed body;
   a first fluid spray component storage tank in said body having an inlet end and an outlet end;
   a second fluid spray component storage tank in said body having an inlet end and an outlet end;
   said inlet end of said first fluid spray component storage tank being in selective fluid communication with a source of a first fluid spray component;
   said inlet end of said second fluid spray component storage tank being in selective fluid communication with a source of a second fluid spray component;
   a first electrical heater assembly associated with said first fluid spray component storage tank which selectively heats the first fluid spray component therein;
   a second electrical heater assembly associated with said second fluid spray component storage tank which selectively heats the second fluid spray component therein;
   a first hot water heater assembly associated with said first fluid spray component storage tank which selectively heats the first fluid spray component therein;
   said first hot water heater assembly being in fluid communication with the heated coolant of the water cooled engine of the vehicle;
   a second hot water heater assembly associated within said second fluid spray component storage tank which selectively heats the second fluid spray component therein;
   said second hot water hot water heater assembly being in fluid communication with the heated coolant of the water cooled engine of the vehicle where said first and second hot water heater assemblies are fluidly connected together;
   an air compressor on said vehicle which is in communication with said first and second fluid spray component storage tanks which forces the fluid outwardly therefrom through the outlet ends thereof;
   a heat exchanger tank having first and second heat exchangers therein;
   each of said first and second heat exchangers having inlet and outlet ends;
   said inlet ends of said first and second heat exchangers of said heat exchanger tank being in fluid communication with the heated coolant of the water cooled engine of the vehicle so that said first and second heat exchangers are in physical contact with the heated coolant to cause the components passing through said heat exchangers to be heated;
   first and second pumps having inlet and outlet ends;
   said outlet ends of said first and second fluid spray storage tanks being in fluid communication with the said inlet ends of said first and second pumps, respectively;
   said outlet ends of said first and second heat exchangers being in fluid communication with a spray nozzle for spraying the first and second fluid spray components onto a surface.

2. The combination of claim 1 wherein said first and second pumps are air driven.

3. The combination of claim 1 wherein each of said tanks is enclosed in an insulated compartment.

4. The combination of claim 1 wherein said first and second electrical heater assemblies are 110 volt heaters.

5. The combination of claim 1 wherein said first and second hot water assemblies comprise tubing fluidly connected to the heated coolant.

6. The combination of claim 5 wherein said tubing is positioned below each of said storage tanks.

7. The combination of claim 1 wherein said air compressor is powered by the vehicle engine.

8. The combination of claim 1 wherein said air compressor is also fluidly connected to said spray nozzle.

9. The combination of claim 1 wherein a hose bundle extends from said spray nozzle.

10. The combination of claim 9 wherein said outlet ends of said first and second heat exchangers are fluidly connected to said spray nozzle by discharge lines extending through said hose bundle.

11. The combination of claim 10 wherein said hose bundle is heated by the heated coolant of said engine.

12. The combination of claim 11 wherein the heated coolant is circulated through said hose bundle.

* * * * *